US012579079B2

(12) United States Patent
Boucard et al.

(10) Patent No.: US 12,579,079 B2
(45) Date of Patent: Mar. 17, 2026

(54) ACCESSING A SECONDARY SHARED RESOURCE USING VIRTUAL IDENTIFIERS

(71) Applicant: QUALCOMM Incorporated, San Diego, CA (US)

(72) Inventors: Philippe Boucard, Le Chesnay (FR); Julien Pauty, Versailles (FR); Ameline Le Rouzic, Versailles (FR); Estelle Jezequel, Paris (FR); Suzie Marin, Issy les Moulineaux (FR)

(73) Assignee: Qualcomm Incorporated, San Diego, CA (US)

( * ) Notice: Subject to any disclaimer, the term of this patent is extended or adjusted under 35 U.S.C. 154(b) by 99 days.

(21) Appl. No.: 18/591,498

(22) Filed: Feb. 29, 2024

(65) Prior Publication Data

US 2025/0278372 A1 Sep. 4, 2025

(51) Int. Cl.
*G06F 13/10* (2006.01)
*G06F 13/42* (2006.01)

(52) U.S. Cl.
CPC .......... *G06F 13/10* (2013.01); *G06F 13/4221* (2013.01); *G06F 2213/0026* (2013.01)

(58) Field of Classification Search
CPC ................. G06F 13/10; G06F 13/4221; G06F 2213/0026
USPC ....... 710/18, 20, 28, 29, 31, 33, 36, 38, 105
See application file for complete search history.

(56) References Cited

U.S. PATENT DOCUMENTS

| | | | | |
|---|---|---|---|---|
| 8,300,641 | B1 * | 10/2012 | Vincent ................... | H04L 69/22 |
| | | | | 370/392 |
| 9,466,036 | B1 * | 10/2016 | Vicaire ................... | H04L 67/10 |
| 2009/0003354 | A1 * | 1/2009 | Sreejith ................... | H04L 47/12 |
| | | | | 370/396 |
| 2017/0064749 | A1 * | 3/2017 | Jain ..................... | H04L 67/1097 |
| 2018/0121125 | A1 * | 5/2018 | Zeng .................... | G06F 3/0622 |
| 2018/0157604 | A1 * | 6/2018 | Tietz ................... | G06F 13/4022 |
| 2022/0417206 | A1 * | 12/2022 | Christidis ........... | G06F 12/0873 |
| 2024/0202051 | A1 * | 6/2024 | Rigamonti .......... | H04L 67/1097 |

* cited by examiner

*Primary Examiner* — Idriss N Alrobaye
*Assistant Examiner* — Henry W Yu
(74) *Attorney, Agent, or Firm* — Norton Rose Fulbright US LLP

(57) ABSTRACT

An apparatus includes a processing system configured to send, via a routing system, a first request for access to a secondary shared resource. The first request is associated with a first virtual identifier, and the first virtual identifier is associated with a first routing path through the routing system from the initiator device to the secondary shared resource. The processing system is further configured to send, via the routing system, a second request for access to the secondary shared resource. The second request is associated with a second virtual identifier, and the second virtual identifier is associated with a second routing path through the routing system from the initiator device to the secondary shared resource. The second routing path is different than the first routing path.

30 Claims, 5 Drawing Sheets

100

200

500 ⟍

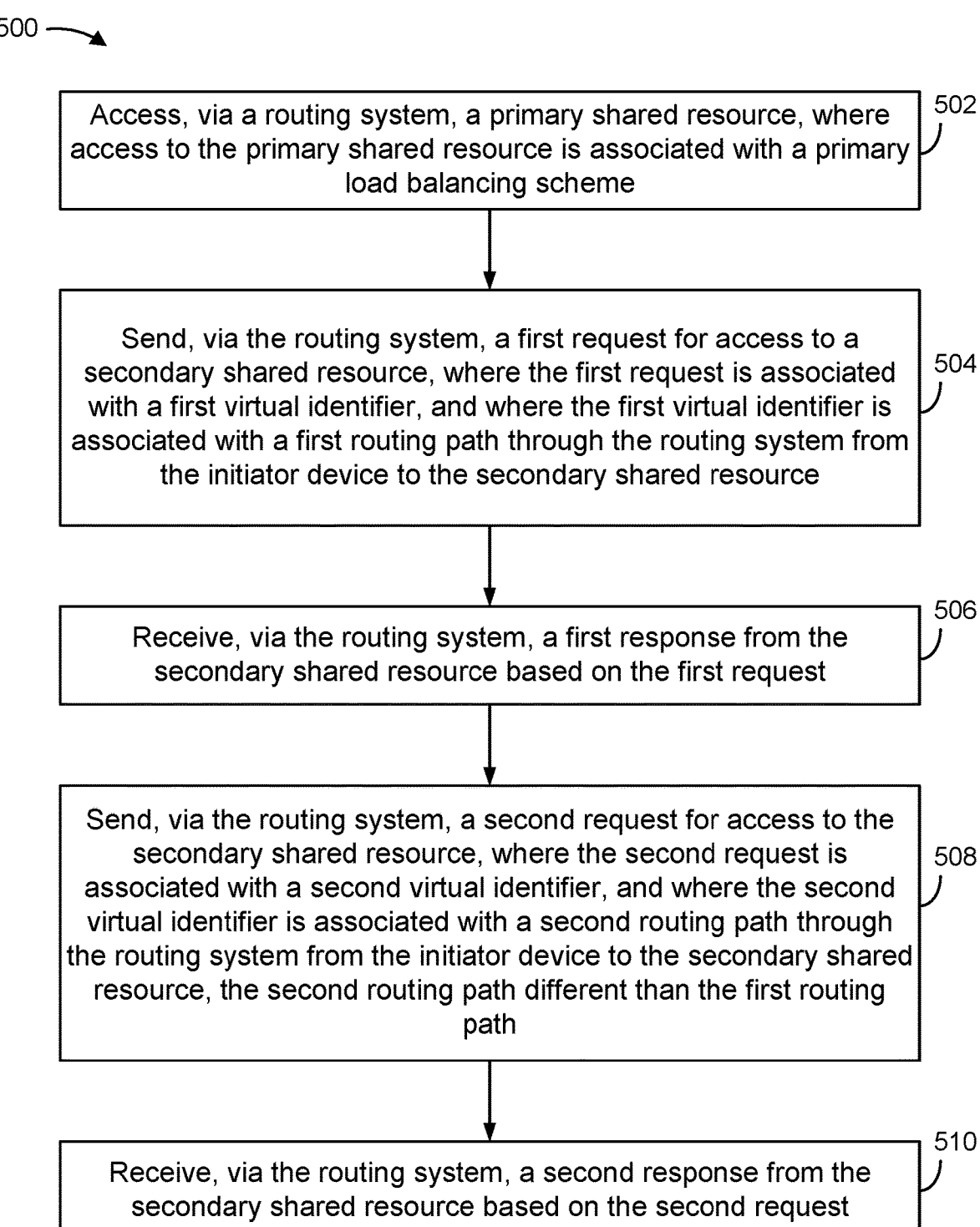

Access, via a routing system, a primary shared resource, where access to the primary shared resource is associated with a primary load balancing scheme        502

Send, via the routing system, a first request for access to a secondary shared resource, where the first request is associated with a first virtual identifier, and where the first virtual identifier is associated with a first routing path through the routing system from the initiator device to the secondary shared resource        504

Receive, via the routing system, a first response from the secondary shared resource based on the first request        506

Send, via the routing system, a second request for access to the secondary shared resource, where the second request is associated with a second virtual identifier, and where the second virtual identifier is associated with a second routing path through the routing system from the initiator device to the secondary shared resource, the second routing path different than the first routing path        508

Receive, via the routing system, a second response from the secondary shared resource based on the second request        510

*FIG. 5*

600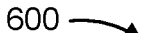

| Receive, via a routing system, a first request for access at a secondary shared resource, where the first request indicates a first virtual identifier associated with the secondary shared resource, and where the first virtual identifier is associated with a first routing path through the routing system to the secondary shared resource | 602 |

| Send, via the routing system, a first response based on the first request | 604 |

| Receive, via the routing system, a second request for access to the secondary shared resource, where the second request indicates a second virtual identifier associated with the secondary shared resource, and where the second virtual identifier is associated with a second routing path through the routing system to the secondary shared resource, the second routing path different than the first routing path | 606 |

| Send, via the routing system, a second response based on the second request | 608 |

*FIG. 6*

ACCESSING A SECONDARY SHARED RESOURCE USING VIRTUAL IDENTIFIERS

TECHNICAL FIELD

Aspects of the present disclosure relate generally to computer information systems, and more particularly, to shared resources within communications systems and initiator devices that access the shared resources.

INTRODUCTION

Computer information systems may include many components such as processing circuits, user interface components, storage components, and other peripheral components. Communication between components may be implemented using a routing network. The routing network may be operated in compliance with standards-defined specifications and protocols. Examples of such specification-defined interfaces include a double data rate (DDR) interface and a Peripheral Component Interconnect Express (PCIe) interface. The PCIe interface may have a shared parallel bus architecture that supports interconnection of two devices using links that include one or more serial, full-duplex lanes.

In some devices, the PCIe interface may utilize at least some portions of the DDR interface. For example, the DDR interface may include a system of switches and routing channels. To access a peripheral device via the PCIe interface, an initiator device may use at least some of the switches and routing channels. Use of the routing channels in such a manner may disrupt operation associated with the DDR interface. Further, performance of the DDR interface may be limited by the "slowest" path in the routing system. For example, access to the DDR interface may be coordinated via a primary load balancing scheme. In some systems, traffic to peripheral devices may not be considered in the load balancing scheme (e.g., where the traffic is relatively low overhead).

Accordingly, communications between an initiator device and a peripheral device may not be subject to the load balancing scheme and may in some cases repeatedly use the same routing path. As a result, performance associated with the DDR interface may be affected by traffic associated with one or more peripheral devices.

BRIEF SUMMARY OF SOME EXAMPLES

In some aspects of the disclosure, an apparatus for operation of an initiator device includes a processing system including one or processors and one or more memories coupled to the one or more processors. The processing system is configured to access, via a routing system, a primary shared resource. Access to the primary shared resource is associated with a primary load balancing scheme. The processing system is further configured to send, via the routing system, a first request for access to a secondary shared resource. The first request is associated with a first virtual identifier, and the first virtual identifier is associated with a first routing path through the routing system from the initiator device to the secondary shared resource. The processing system is further configured to send, via the routing system, a second request for access to the secondary shared resource. The second request is associated with a second virtual identifier, and the second virtual identifier is associated with a second routing path through the routing system from the initiator device to the secondary shared resource. The second routing path is different than the first routing path.

In some other aspects, a method of operation of an initiator device includes accessing, via a routing system, a primary shared resource. Access to the primary shared resource is associated with a primary load balancing scheme. The method further includes sending, via the routing system, a first request for access to a secondary shared resource. The first request is associated with a first virtual identifier, and the first virtual identifier is associated with a first routing path through the routing system from the initiator device to the secondary shared resource. The method also includes sending, via the routing system, a second request for access to the secondary shared resource. The second request is associated with a second virtual identifier, and the second virtual identifier is associated with a second routing path through the routing system from the initiator device to the secondary shared resource. The second routing path is different than the first routing path.

In some other aspects, an apparatus for operation of a secondary shared resource includes a processing system including one or processors and one or more memories coupled to the one or more processors. The processing system is configured to receive, via a routing system, a first request for access at the secondary shared resource. The first request indicates a first virtual identifier associated with the secondary shared resource, and the first virtual identifier is associated with a first routing path through the routing system to the secondary shared resource. The processing system is further configured to receive, via the routing system, a second request for access to the secondary shared resource. The second request indicates a second virtual identifier associated with the secondary shared resource, and the second virtual identifier is associated with a second routing path through the routing system to the secondary shared resource. The second routing path is different than the first routing path.

In some other aspects, a method of operation of a secondary shared resource includes receiving, via a routing system, a first request for access at the secondary shared resource. The first request indicates a first virtual identifier associated with the secondary shared resource, and the first virtual identifier is associated with a first routing path through the routing system to the secondary shared resource. The method further includes receiving, via the routing system, a second request for access to the secondary shared resource. The second request indicates a second virtual identifier associated with the secondary shared resource, and the second virtual identifier is associated with a second routing path through the routing system to the secondary shared resource. The second routing path is different than the first routing path.

While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations.

In some configurations, devices incorporating described aspects and features may also include additional components and features for implementation and practice of claimed and described aspects. For example, transmission and reception of wireless signals may includes a number of components for analog and digital purposes (e.g., hardware components including antenna, radio frequency (RF)-chains, power amplifiers, modulators, buffer, processor(s), interleaver, adders/summers, etc.). Innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 5 is a flow chart illustrating an example of a method of operation of an initiator device according to some aspects of the disclosure.

FIG. 6 is a flow chart illustrating an example of a method of operation of a secondary shared resource according to some aspects of the disclosure.

Like reference numbers and designations in the various drawings indicate like elements.

DETAILED DESCRIPTION

In some aspects of the disclosure, initiator devices may use virtual identifiers to load balance traffic associated with a secondary shared resource. Use of the virtual identifiers may reduce or avoid disbalancing a load balancing scheme associated with a primary shared resource that shares at least some of a routing system with the secondary shared resource. In some aspects of the disclosure, messages associated with the secondary shared resource may be interleaved among different routing paths "at the source" (e.g., at the initiator device or at the secondary shared resource) by assigning each such message a respective routing path of the routing system via a particular virtual identifier.

One or more features described herein may improve performance of a device, may reduce cost associated with design and fabrication of a device, or both. For example, use of the virtual identifiers may distribute traffic to the secondary shared resource among different routing paths equally or approximately equally, reducing or avoiding disbalance to a load balancing scheme associated with a primary shared resource that also uses the routing system. As another example, use of the virtual identifiers may reduce or avoid reliance on "dedicated" routing channels for accessing the secondary shared resource, which may occupy additional circuit area and which may be relatively expensive to implement for some device architectures. As an additional example, the virtual identifiers may be generated using software (e.g., at design time) independently of the particular network topology (e.g., with zero hardware overhead, or relatively low hardware overhead).

Figure 1:
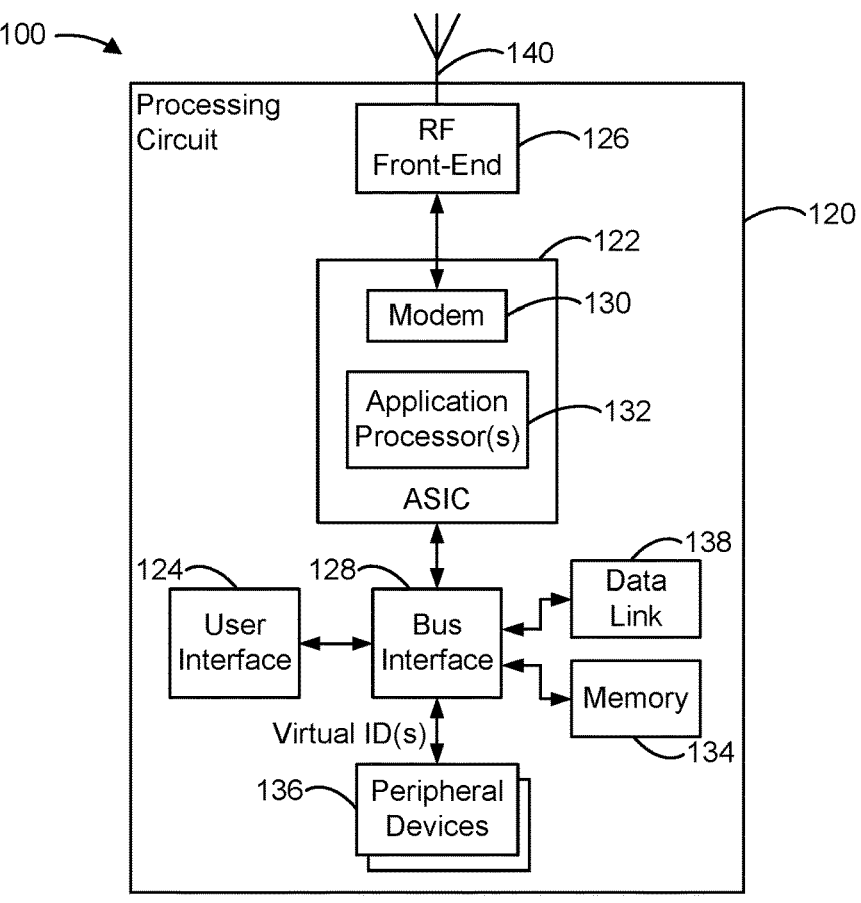
FIG. 1 illustrates an example of a system according to one or more aspects of the disclosure.

According to certain aspects, a bus interface, such as a PCIe bus interface, may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, or any other similar functioning device. FIG. 1 depicts an example of such a system 100. The system 100 may include a processing circuit 120 having multiple devices or circuits 122, 124, 126, 128, 136, and/or 138. The processing circuit 120 may be implemented in an application-specific IC (ASIC) or system on chip (SoC) that may include multiple devices or circuits 122, 124, 126, 128, 136, and/or 138 as different components that may communicate with each other through busses. In one example, the system 100 may be a communication device and the processing circuit 120 may include a modem 130 that interfaces with a radio frequency (RF) RF front-end circuit 126 that enables the apparatus to communicate through one or more antennas 140 with a radio access network, a core access network, the Internet and/or another network.

The processing circuit 120 includes an application-specific integrated circuit (ASIC) device 122 that has one or more application processors 132 (e.g., a heterogenous mix of processors of different configurations, such as performance cores and efficiency cores), one or more modems 130 (e.g., baseband modems), and/or other logic circuits or functions. The processing circuit 120 may be controlled by a basic input/output system (BIOS), firmware, and/or an operating system and may provide an application programming interface (API) layer that enables the one or more application processors 132 to execute software modules residing in the memory device 134. The software modules may include instructions and data stored in a processor readable storage such as the memory device 134.

The ASIC device 122 may access an internal memory, the memory device 134, and/or storage devices included in peripheral devices 136 or storage devices outside the processing circuit 120. Memory may include read-only memory (ROM) or random-access memory (RAM), electrically erasable programmable ROM (EEPROM), flash cards, or any memory device that can be used in processing systems and computing platforms. The processing circuit 120 may include, or have access to, a local database or other parameter storage that maintains operational parameters and other information used to configure and operate the system 100 and/or the processing circuit 120. The local database may be implemented using registers, a database module, flash memory, magnetic media, EEPROM, optical media, tape, soft or hard disk, or the like. The processing circuit 120 may also be operably coupled to external devices such as the antennas 140, a display, user interface 124 (e.g., a button, an integrated or external keypad, and/or a touch screen).

The processing circuit 120 may communicate through a bus interface circuit 128, which may include a combination of circuits, counters, timers, control logic and other configurable circuits or modules. In one example, the bus interface circuit 128 may be configured to operate in accordance with PCIe specifications and protocols. The processing circuit 120 may include or control a power management function that configures and manages the bus interface 128, the user interface 124, the RF front-end circuit 126, and the operation of one or more application processors 132 resident in the ASIC device 122. In certain modes of operation, the bus interface circuit 128 may be configured to transition between power states based on activity of the bus interface 128.

The bus interface 128 operates using one or more links. In an embodiment of a PCIe interface, the bus interface 128 may operate using high-speed serial links. The PCIe interface 128 may be characterized as having a point-to-point topology, with separate serial links connecting each device to a host, or root complex.

Figure 2:
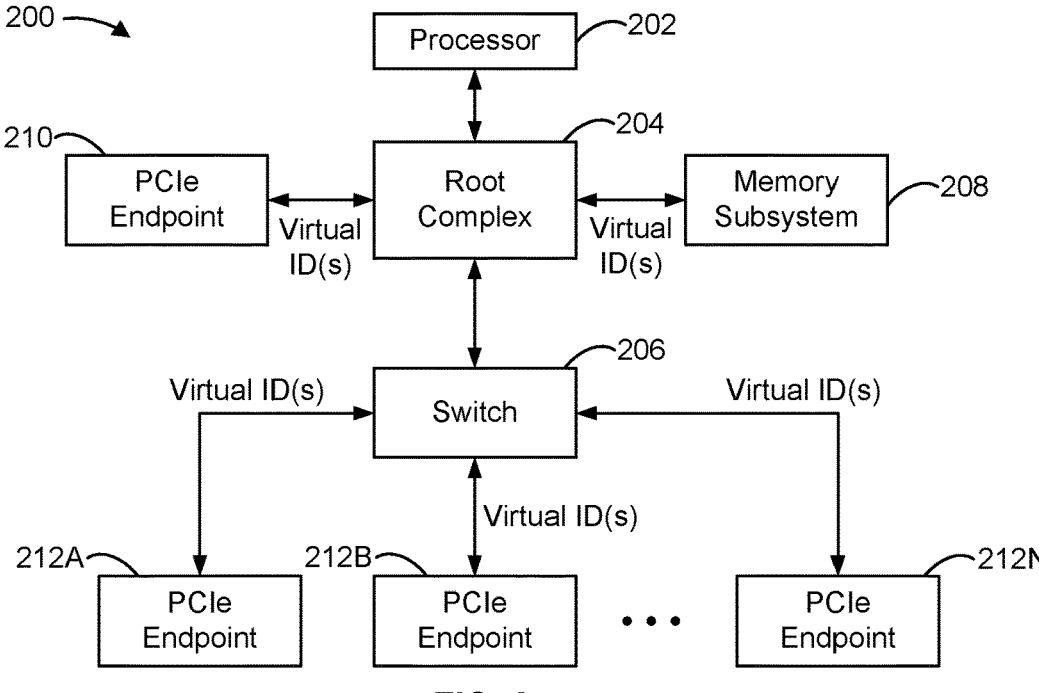
FIG. 2 illustrates an example of a Peripheral Component Interconnect Express (PCIe) system according to some aspects of the disclosure.

FIG. 2 illustrates an example of a PCIe system 200 according to some aspects of the disclosure. In the PCIe system 200, the root complex 204 couples a processor 202 to memory devices (e.g., the memory subsystem 208) and a switch circuit 206. In some configurations, the switch circuit 206 includes cascaded switch devices. One or more PCIe endpoint devices 210 may be coupled directly to the root complex 204, while other PCIe endpoint devices 212A, 212B, . . . , 212N may be coupled to the root complex 204 through the switch circuit 206. The root complex 204 may be coupled to the processor 202 using a proprietary local bus interface or a standards-defined local bus interface. The root complex 204 may control operations of the PCIe system 200 and may generate transaction requests for the processor 202. In some examples, the root complex 204 is implemented in the same IC device that includes the processor 202. A root complex 204 may support multiple PCIe ports.

The root complex 204 may control communication between the processor 202, the memory subsystem 208 and/or other PCIe endpoint devices 210, 212A, 212B, . . . , 212N. An endpoint device 210, 212A, 212B, . . . , 212N may be defined as a device other than the root complex 204 that is capable of requesting or initiating a PCIe transaction or responding to a PCIe transaction. The PCIe system 200 may support full-duplex communication between any two endpoints, with no inherent limitation on concurrent access across multiple endpoints.

Information to be communicated using the PCIe system 200 is encapsulated in packets in accordance with PCIe bus protocols. Devices coupled to a PCIe bus may communicate using one or more PCIe lanes. A PCIe lane may be defined as a point-to-point communication channel between two PCIe ports. A PCIe lane may provide full-duplex communication and may include two differentially encoded pairs of signaling wires or signal traces, with one pair of wires being used for transmitting data and the other pair of wires being used for receiving data. Packets may carry information in eight-bit bytes. In a multi-lane PCIe link, packet data may be striped across multiple lanes. The number of lanes in the multi-lane link may be negotiated during device initialization.

At least some components described with reference to FIGS. 1 and 2 may utilize virtual identifiers (IDs) to access a shared resource. Some illustrative examples associated with virtual IDs are described further with reference to FIG. 3.

Figure 3:
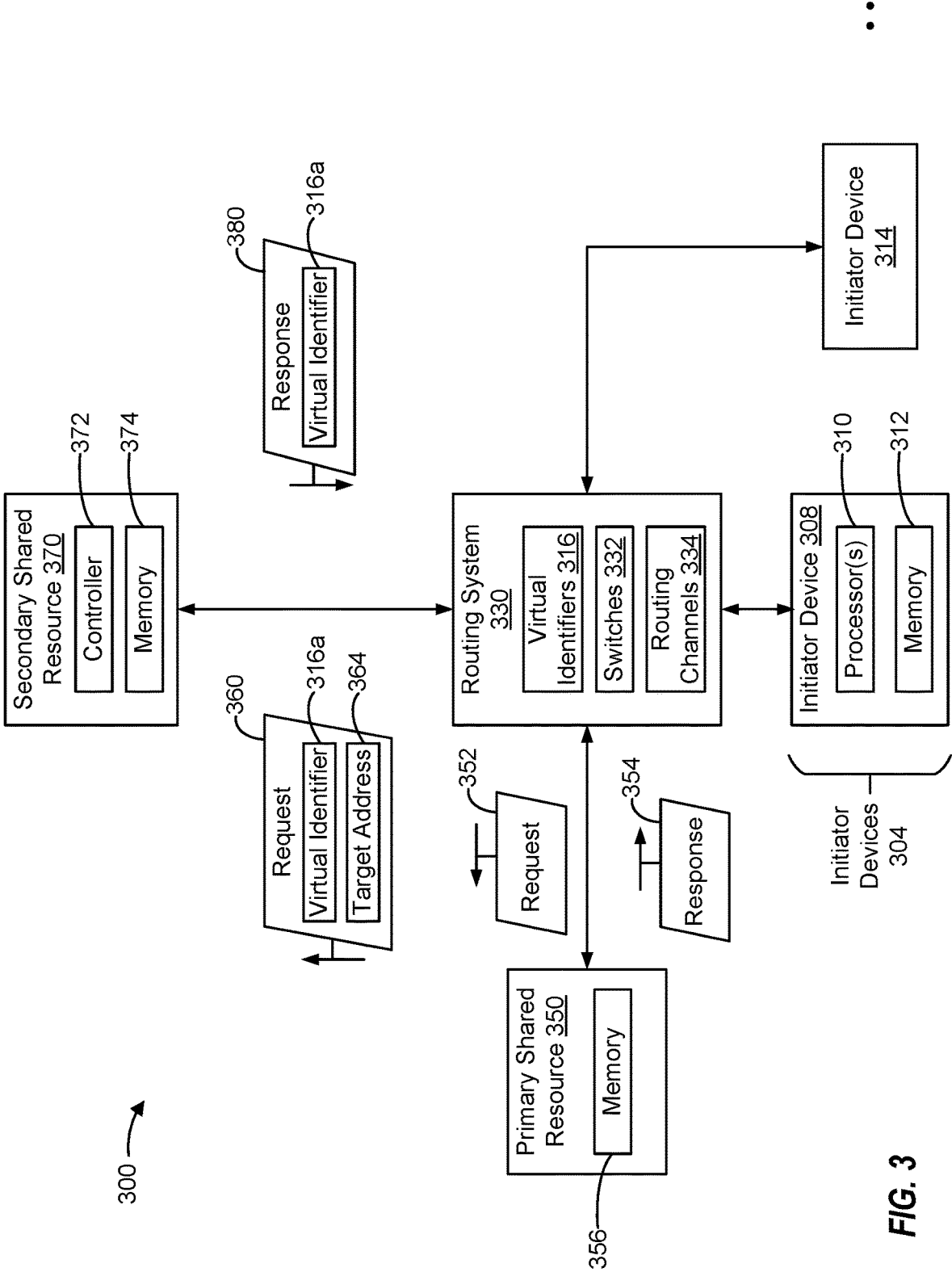
FIG. 3 illustrates an example of a system according to some aspects of the disclosure.

FIG. 3 illustrates an example of a system 300 according to some aspects of the disclosure. The system 300 may include initiator devices 304 (e.g., an initiator device 308 and an initiator device 314). The system 300 may further include a shared primary resource 350 and a secondary shared resource 370. In some examples, the initiator devices 304 may be referred to as master devices, and the secondary shared resource 370 may be referred to as a slave device.

The initiator devices 304 may be coupled to the shared primary resource 350 and to the secondary shared resource 370 via a routing system 330. In some examples, the routing system 330 may include switches 332 and routing channels 334. Some example switches 332 and routing channels 334 are described further with reference to FIG. 4.

In some examples, the initiator devices 304 may include processors or other devices that access the shared primary resource 350 and to the secondary shared resource 370 via a routing system 330. For example, the initiator device 308 may correspond to a central processing unit (CPU), a digital signal processor (DSP), a graphics processing unit (GPU), an application processor, or another type of processor.

In some implementations, the primary shared resource may include a memory device, such as a memory 356 that is accessible via a double data rate (DDR) interface that is connected to the routing system 330. The DDR interface may facilitate memory accesses associated with the memory 356. In some examples, the memory 356 may include a random access memory (RAM), such as a dynamic random access memory (DRAM), a static random access memory (SRAM), or another memory. The secondary shared resource 370 may include another type of memory (or other resource), such as memory device that is accessible via a Peripheral Component Interconnect Express (PCIe) interface that may include, or that may utilize, at least some of the routing system 330. For example, the routing channels 334 may be used to access to the shared secondary resource 370.

To further illustrate, the primary shared resource 350 may be associated with a first access type (e.g., a DDR access type or another access type), and the secondary shared resource 370 may be associated with a second access type different than the first access type (e.g., a PCIe access type or another access type). Accordingly, in some examples, the system 300 may include heterogenous access types, which may increase difficulty of load balancing in some cases. Examples of such heterogenous access types may include, for example, a DDR access type and a PCIe access type.

One or more devices described herein may include a processing system that includes one or more processors and one or more memories coupled to the one or more processors. For example, the initiator device 308 may include one or more processors 310 and a memory 312 coupled to the one or more processors. As another example, the secondary shared resource 370 may include a controller 372 (e.g., a memory controller or another controller) and a memory 374.

One or more components of FIG. 3 may be included in the system 100 of FIG. 1, the PCIe system 200 of FIG. 2, or a combination thereof. To illustrate, in some examples, the initiator device 308 may correspond to an application processor of the one or more application processors 132 or the processor 202. In some examples, the primary shared resource 350 may correspond to the memory device 134 or the memory subsystem 208. Further, in some examples, the secondary shared resource 370 may correspond to a peripheral device of the peripheral devices 136, the PCIe endpoint 210, or any of the PCIe endpoints 212A-N. In some examples, the routing system 330 may include one or more of the bus interface 128, the root complex 204, or the switch circuit 206. Other examples are also within the scope of the disclosure.

In some examples, the system 300 may include a system-on-chip (SoC) device. For example, the initiator devices 304, the primary shared resource, and the routing system 330 may be included in the SoC device. In some implementations, the secondary shared resource 370 may be off-chip with respect to the SoC device and may be referred to as an off-chip target.

During operation, one or more of the initiator devices 304 may access the primary shared resource 350. For example, the initiator device 308 may send, via the routing system 330, a request 352 to the primary shared resource 350. The primary shared resource 350 may send, via the routing system 330, a response 354 to the initiator device 308 based on the request 352. To further illustrate, in some examples, the request 352 may include a write command and data to be written to the primary shared resource 350, and the response 354 may indicate a status associated with executing the write command. In some other examples, the request 352 may include a read command for data to be read from the primary shared resource 350, and the response 354 may include the data. Further, other initiator devices of the initiator devices 304 (e.g., the initiator device 314) may also access the primary shared resource 350 via the routing system 330.

The routing system 330 may allocate access to the primary shared resource 350 in accordance with a primary load balancing scheme. For example, the routing system 330 may interleave requests from the initiator devices 304 (such as the request 352) and responses to the requests from the primary shared resource 350 (such as the response 354) in accordance with the primary load balancing scheme to load balance access to the primary shared resource 350. Accordingly, a primary load balancing scheme may refer to or may include a memory interleaving scheme that interleaves memory access requests over a plurality of routing channels, such as the routing channels 334.

In some aspects, the secondary shared resource 370 may share at least some of the routing system 330 with the primary shared resource 350. As another example, in some implementations, the secondary shared resource 370 may be connected to the routing system 330 after the primary load balancing scheme is determined for the system 300. As a result, access to the secondary shared resource may affect performance of the system 300, such as by disbalancing access to the primary shared resource 350 (e.g., where the same path through the routing system 330 is selected for a relatively large quantity of accesses to the secondary shared resource 370).

In some aspects of the disclosure, one or more of the initiator devices 304 may use virtual identifiers 316 to enable distribution of traffic associated with the secondary shared resource 370 among at least some of the routing channels 334 independently of the primary load balancing scheme. In some examples, the virtual identifiers 316 may designate respective routing paths of the routing system 330. For example, each virtual identifier of the virtual identifiers 316 may correspond to a respective combination of one or more switches of the switches 332 and a routing channel of the routing channels 334. As a result, use of the virtual identifiers 316 may distribute traffic among different paths of the routing system 330, which may reduce or avoid disbalancing access to the primary shared resource 350.

To further illustrate, the initiator device 308 may send, via the routing system 330, a request 360 for access to the secondary shared resource 370. The request 360 may specify a virtual identifier 316a of the virtual identifiers 316. The virtual identifier 316a may be associated with one or more switches of the switches 332 (e.g., a subset of the switches 332), a routing channel of the routing channels 334 (e.g., a subset of the routing channels 334), or a combination thereof.

In some examples, the request 360 may correspond to a request for access to the secondary shared resource 370. For example, the request 360 may correspond to a write command to write data to the memory 374. In such examples, the request 360 may indicate or may be associated with a target address 364 and may include data to be written to the target address 364 of the memory 374. In some other examples, the request 360 may correspond to a read command to read data from the memory 374. In such examples, the target address 364 may correspond an address from which to read data from the memory 374.

The secondary shared resource 370 may send, to the initiator device 308, a response 380 based on the request 360. To illustrate, the request 360 may include a write command and data to be written to the secondary shared resource 370, and the response 380 may indicate a status associated with executing the write command. In some other examples, the request 360 may include a read command for data to be read from the secondary shared resource 370, and the response 380 may include the data.

In some aspects of the disclosure, the routing system 330 may route the response 380 to the initiator device 308 based on the virtual identifier 316a. For example, the response 380 may include the virtual identifier 316a, and the routing system 330 may route the response 380 to the initiator device 308 using one or more switches of the switches 332 (e.g., a subset of the switches 332), one or more routing channels of the routing channels 334 (e.g., a subset of the routing channels 334), or a combination thereof. In some examples, the routing system 330 may route the request 360 and the response 380 via a common path through the routing system (e.g., via a common set of one or more switches of the switches 332 and one or more routing channels of the routing channels 334). The common path may be associated with the virtual identifier 316a.

To further illustrate, in some implementations, use of the virtual identifier 316a to route the response 380 may improve performance as compared to another technique, such as use of an initiator identifier of the initiator device 308. For example, the system 300 may include a relatively large quantity of initiator devices 304, such as if the system 300 includes many more initiator devices 304 than secondary shared resources. In some such examples, the system 300 may include a first quantity of initiator devices 304 that exceeds a second quantity of secondary shared resources. As a result, assignment of an initiator identifier to each initiator device of the initiator devices 304 may be associated with a relatively large quantity of bits to indicate each such initiator device. Accordingly, to reduce or avoid overhead that may be associated with a large quantity of such initiator identifiers, the routing system 330 may "reuse" the virtual identifier 316a for the response 380 (in addition to the request 360) to enable routing of the response 380 and the request 360 via a common routing path of the routing system 330.

Further, in some implementations, the routing system 330 may include a memory that stores (e.g., caches) a table, such as a lookup table (LUT). The table may indicate a mapping of at least some of the initiator devices 304 to at least some of the virtual identifiers 316. For example, after receiving the request 360 from the initiator device 308, the routing system 330 may update the table to indicate that the virtual identifier 316a is associated (at least temporarily) with the secondary shared resource 370. Upon receiving the response 380 from the secondary shared resource 370, the routing system 330 may identify that the response 380 indicates the virtual identifier 316a. The routing system 330 may access the table based on the virtual identifier 316a to determine that the virtual identifier 316a is associated (at least temporarily) with the initiator device 308. The routing system 330 may route the response 380 to the initiator device 308 based on determining that the virtual identifier 316a is associated (at least temporarily) with the initiator device 308. As a result, in some implementations, the virtual identifiers 316 may be "reused" for responses from the secondary shared resource 370 (in addition to requests from the initiator devices 304).

In some implementations, a virtual identifier may be selected from the virtual identifiers 316 for a particular request in accordance with one or more techniques. Further, in some examples, selection of such a virtual identifier from the virtual identifiers 316 for a request may also determine a routing path of the routing system 330 for the request. For example, each routing path of the routing system 330 may be associated with a respective predetermined virtual identifier of the virtual identifiers 316, and a request may be associated with a specific virtual identifier (and therefore a specific routing path) based on one or more criteria. In one example, a virtual identifier may be selected from the virtual identifiers 316 based on addresses associated with the secondary shared resource 370, such as addresses of the memory 374. For example, the virtual identifier 316a may include or correspond to a hash of the target address 364. Alternatively or in addition to selecting a virtual identifier based on a hash function, a virtual identifier may be selected using a modulus function. Other examples are also within the scope of the disclosure.

Figure 4:
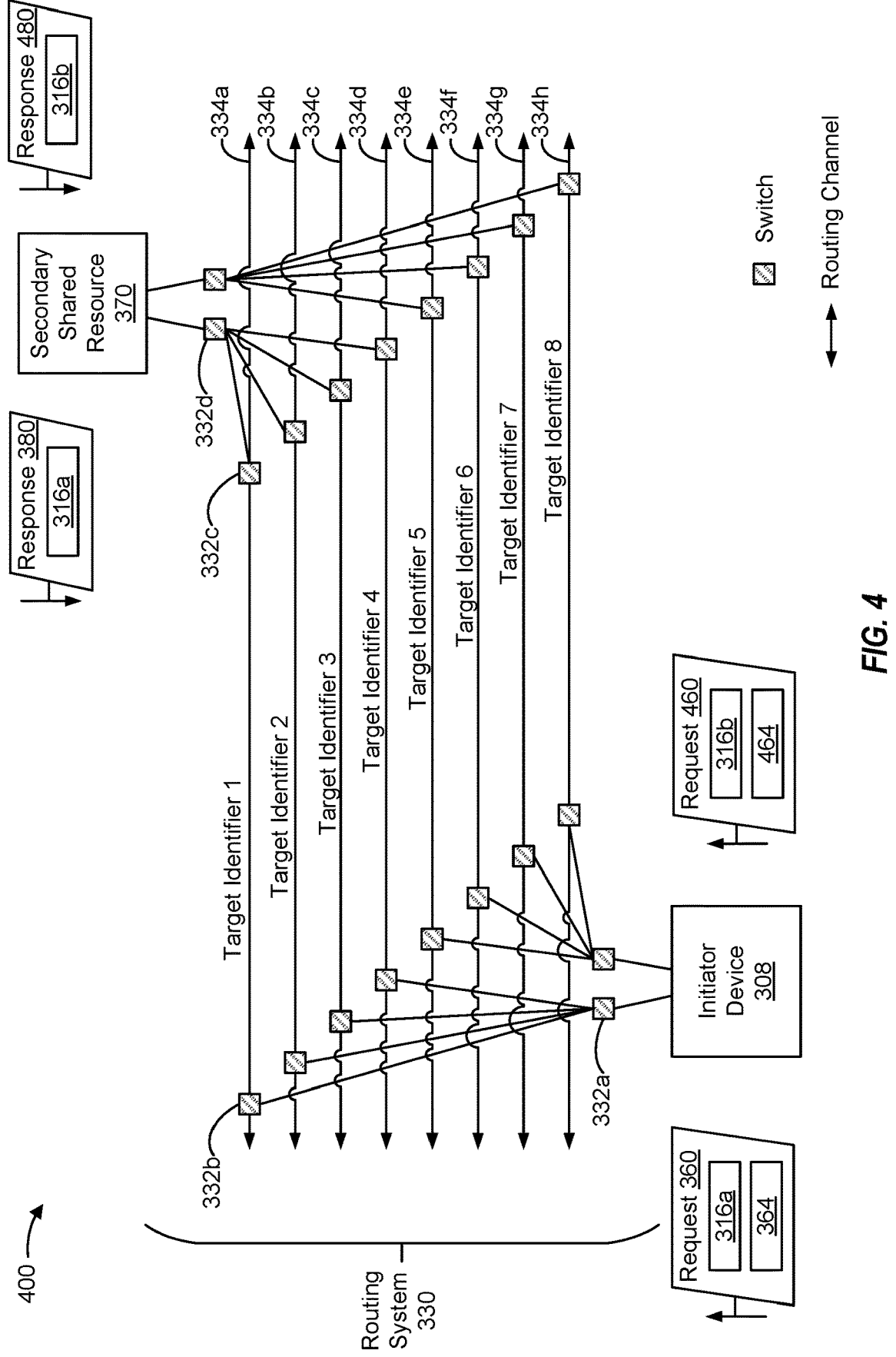
FIG. 4 illustrates an example of a system according to some aspects of the disclosure.

FIG. 4 illustrates an example of a system 400 according to some aspects of the disclosure. The system 400 may correspond to a partial view of the system 300 of FIG. 3. For example, the system 400 may include the initiator devices 304 (e.g., the initiator device 308) and the secondary shared resource 370.

FIG. 4 also illustrates at least a portion of the routing system 330. The routing system 330 may include the switches 332, such as switches 332a-d. The routing system 330 may further include routing channels, such as routing channels 334a-h. In some examples, the routing channels 334a-h may each include, or may be referred to as, a spine.

Further, in the example of FIG. 4, each of the virtual identifiers 316 may be associated with a respective routing path of the routing system 330. In the example of FIG. 4, the virtual identifiers 316 may include eight virtual identifiers each corresponding to a respective routing path. In the example of FIG. 4, the virtual identifiers 316 may be represented as target identifiers 1, 2, 3, 4, 5, 6, 7, and 8.

During operation, traffic between the initiator devices 304 and the secondary shared resource 370 may be distributed within the routing system 330 using the virtual identifiers 316. In one example, the virtual identifier 316a may be associated with a first routing path that includes the switch 332a, the switch 332b, the routing channel 334a, the switch 332c, and the switch 332d. In such examples, the request 360 may be routed from the initiator device to the secondary shared resource 370 via the first routing path.

Further, in some examples, the response 380 may also indicate the virtual identifier 316a (e.g., where the virtual identifier 316a is "reused" for the response 380). In such examples, the response 380 may be routed from the secondary shared resource 370 to the initiator device 308 via the first routing path.

In some examples, after sending the request 360 and receiving the response 380, the initiator device 308 may send one or more additional requests to the secondary shared resource 370 and may receive one or more additional responses from the secondary shared resource 370. Such additional requests and responses may also use a virtual identifier of the virtual identifiers 316.

To illustrate, the initiator device 308 may send a request 460 to the secondary shared resource 370. The request 460 may indicate a virtual identifier 316b of the virtual identifiers 316 and may further indicate a target address 464 associated with the secondary shared resource 370. In some examples, the virtual identifier 316b may be associated with a second routing path that includes, for example, one of the routing channels 334b-h.

The secondary shared resource 370 may receive the request 460 via the second routing path and may send a response 480 to the initiator device 308. The response 480 may indicate the virtual identifier 316b. In such examples, the response 480 may be routed to the initiator device 308 via the second routing path.

In some examples, the first routing path may include a first set of one or more switches of the routing system 330, the second routing path may include a second set of one or more switches of the routing system 330, and the first set may be non-identical to the second set. For example, the first set may include at least one switch not included in the second set. Alternatively, or in addition, the second set may include at least one switch not included in the first set.

Alternatively, or in addition, the first routing path may include a first set of one or more routing channels of the routing system, the second routing path may include a second set of one or more routing channels of the routing system, and the first set may be non-identical to the second set. For example, the first set may include at least one routing channel not included in the second set. Alternatively, or in addition, the second set may include at least one routing channel not included in the first set. To illustrate, in some examples, the first set may include one of the routing channels 334a-h, and the second set may include another of the routing channels 334a-h.

Although not illustrated in the example of FIG. 4, each of the routing channels 334a-h may be used to access one or more primary shared resources, such as the primary shared resource 350 of FIG. 3. Further, each of the routing channels 334a-h may include or may be referred to as a DDR channel. The plurality of DDR channels may be included in a system-on-chip (SoC) device, and the secondary shared resource 370 may include a PCIe-off-chip target that is off-chip with respect to the SoC device. In an example, a first routing path associated with the virtual identifier 316a may include a first DDR channel of the plurality of DDR channels, and a second routing path associated with the virtual identifier 316b may include a second DDR channel of the plurality of DDR channels different than the first DDR channel.

To further illustrate some aspects of the disclosure, an interconnect with a topology may be represented by an unoriented graph. The topology may be determined based on criteria such as, but not limited to, a master-slave connectivity table, a floorplan, and avoidance of bandwidth bottlenecks in the interconnect. The unoriented graph may then be searched for paths, or routes, according to the connectivity table, resulting in an oriented graph. The oriented graph may optionally highlight edges not used by any route.

To implement load balancing, multiple routes between a master and the slave may be determined in advance. The routes may be determined automatically using the topology of the network. In an implementation in which routing is performed by identifiers (IDs), each network unit may use such IDs to perform routing to a target, thus forming a path. The slaves to which traffic is to be load balanced may be each given a set of (virtual) slave IDs (also referred to herein as virtual IDs), with one virtual ID per route reaching the slaves. Each route between a master and a load-balanced slave may use a different slave ID from the set of virtual IDs. These routes and the corresponding slave IDs may be used to configure the routing tables of the network units. At the entry of the network, the traffic may be decoded to choose one of the routes. Once the route is chosen, the traffic may be routed to the slave through the network using the routing table of the network units on the path. In order to respect the balancing of the request traffic (master to slave), the response traffic (slave to master) may use the same path as the request. The traffic may be routed to the slave through the network using the routing table of the network units on the path. In some aspects, a slave may have multiple virtual IDs. For example, if the slave has four virtual IDs, then there may be four routes to the slave, and traffic may be load balanced on the four paths.

In some aspects, slave IDs may be virtualized without virtualization of master IDs. The virtual slave IDs may allow routing of a request from the master to the slave and also for response from the slave to the master. "Reusing" slave IDs for such responses may simplify some designs, such as if the number of masters is relatively large.

In some aspects, the computation of the routes and the configuration of the switches routing tables may enable static routing, which may reduce complexity of routing in the network. Further, such an implementation may not depend on the topology of the network and the number of routes to load balance traffic. In some examples, such an implementation may be reused for multiple projects and may be quickly regenerated upon occurrence of a design modification (e.g., if an interconnect is modified during an SoC development cycle).

FIG. 5 is a flow chart illustrating an example of a method 500 of operation of an initiator device according to some aspects of the disclosure. In some examples, the method 500 may be performed by one of the initiator devices 304, such as the initiator device 308 or the initiator device 314.

The method 500 includes accessing, via a routing system, a primary shared resource, at 502. Access to the primary shared resource is associated with a primary load balancing scheme. For example, the initiator device 308 or the initiator device 314 may access the primary shared resource 350 via the routing system 330, such as by performing one or more of sending the request 352 or receiving the response 354.

The method 500 further includes sending, via the routing system, a first request for access to a secondary shared resource, at 504. The first request is associated with a first virtual identifier, and the first virtual identifier is associated with a first routing path through the routing system from the initiator device to the secondary shared resource. For example, the initiator device 308 (or the initiator device 314) may send, via the routing system 330, the request 360 for access to the secondary shared resource 370. The request 360 may be associated with the virtual identifier 316a, and the virtual identifier 316a may be associated with a first routing path through the routing system 330 from the initiator device 308 (or the initiator device 314) to the secondary shared resource 370.

In some examples, the method 500 may further include receiving, via the routing system, a first response from the secondary shared resource based on the first request, at 506. For example, the initiator device 308 (or the initiator device 314) may receive, via the routing system 330, the response 380 from the secondary shared resource 370.

The method 500 further includes sending, via the routing system, a second request for access to the secondary shared resource, at 508. The second request is associated with a second virtual identifier, and the second virtual identifier is associated with a second routing path through the routing system from the initiator device to the secondary shared resource. The second routing path is different than the first routing path. For example, the initiator device 308 (or the initiator device 314) may send, via the routing system 330, the request 460 for access to the secondary shared resource 370. The request 460 may be associated with the virtual identifier 316b, and the virtual identifier 316b may be associated with a second routing path through the routing system 330 from the initiator device 308 (or the initiator device 314) to the secondary shared resource 370.

In some examples, the method 500 may further include receiving, via the routing system, a second response from the secondary shared resource based on the second request, at 510. For example, the initiator device 308 (or the initiator device 314) may receive, via the routing system 330, the response 480 from the secondary shared resource 370.

FIG. 6 is a flow chart illustrating an example of a method 600 of operation of a secondary shared resource according to some aspects of the disclosure. In some examples, the method 600 may be performed by the secondary shared resource 370.

The method 600 includes receiving, via a routing system, a first request for access at the secondary shared resource, at 602. The first request indicates a first virtual identifier associated with the secondary shared resource, and the first virtual identifier is associated with a first routing path through the routing system to the secondary shared resource. For example, the routing system 330 may receive the request 360 from the initiator device 308 (or from the initiator device 314). The request 360 may be associated with the virtual identifier 316a, and the virtual identifier 316a may be associated with a first routing path through the routing system 330 from the initiator device 308 (or the initiator device 314) to the secondary shared resource 370.

In some examples, the method 600 may further include sending, via the routing system, a first response based on the first request, at 604. For example, the secondary shared resource 370 may send the response 380 to the initiator device 308 (or the initiator device 314) via the routing system 330.

The method 600 further includes receiving, via the routing system, a second request for access to the secondary shared resource, at 606. The second request indicates a second virtual identifier associated with the secondary shared resource, and the second virtual identifier is associated with a second routing path through the routing system to the secondary shared resource. The second routing path is different than the first routing path. For example, the routing system 330 may receive the request 460 from the initiator device 308 (or from the initiator device 314). The request 460 may be associated with the virtual identifier 316b, and the virtual identifier 316b may be associated with a second routing path through the routing system 330 from the initiator device 308 (or the initiator device 314) to the secondary shared resource 370.

In some examples, the method 600 may further include sending, via the routing system, a second response based on the second request, at 608. For example, the secondary shared resource 370 may send the response 480 to the initiator device 308 (or the initiator device 314) via the routing system 330.

One or more features described herein may improve performance of a device, may reduce cost associated with design and fabrication of a device, or both. For example, use of the virtual identifiers 316 may distribute traffic to the secondary shared resource 370 among different routing paths of the routing system 330 equally or approximately equally, reducing or avoiding disbalance to a load balancing scheme associated with the primary shared resource 350. As another example, use of the virtual identifiers 316 may reduce or avoid reliance on "dedicated" routing channels for accessing the secondary shared resource 370. Such dedicated routing channels may occupy additional circuit area and may be relatively expensive to implement for some device architectures. As an additional example, the virtual identifiers 316 may be generated using software (e.g., at design time) independently of the particular network topology (e.g., with zero hardware overhead, or relatively low hardware overhead).

In a first aspect, an apparatus for operation of an initiator device includes a processing system including one or processors and one or more memories coupled to the one or more processors. The processing system is configured to access, via a routing system, a primary shared resource. Access to the primary shared resource is associated with a primary load balancing scheme. The processing system is further configured to send, via the routing system, a first request for access to a secondary shared resource. The first request is associated with a first virtual identifier, and the first virtual identifier is associated with a first routing path through the routing system from the initiator device to the secondary shared resource. The processing system is further configured to receive, via the routing system, a first response from the secondary shared resource based on the first request and to send, via the routing system, a second request for access to the secondary shared resource. The second request is associated with a second virtual identifier, and the second virtual identifier is associated with a second routing path through the routing system from the initiator device to the secondary shared resource. The second routing path is different than the first routing path. The processing system is further configured to receive, via the routing system, a second response from the secondary shared resource based on the second request.

In a second aspect, in combination with the first aspect, the secondary shared resource is associated with a plurality of virtual identifiers including the first virtual identifier and the second virtual identifier, and the plurality of virtual identifiers designate respective routing paths of the routing system.

In a third aspect, in combination with one or more of the first aspect or the second aspect, the plurality of virtual identifiers enable distribution of traffic associated with the secondary shared resource among the routing system independently of the primary load balancing scheme.

In a fourth aspect, in combination with one or more of the first aspect through the third aspect, the first routing path includes a first set of one or more switches of the routing system, the second routing path includes a second set of one or more switches of the routing system, and the first set is non-identical to the second set.

In a fifth aspect, in combination with one or more of the first aspect through the fourth aspect, the first routing path includes a first set of one or more routing channels of the routing system, the second routing path includes a second set of one or more routing channels of the routing system, and the first set is non-identical to the second set.

In a sixth aspect, in combination with one or more of the first aspect through the fifth aspect, the processing system is further configured to receive, via the routing system, a first response from the secondary shared resource based on the first request and to receive, via the routing system, a second response from the secondary shared resource based on the second request. The routing system is configured to route the first response to the initiator device via the first routing path based on the first response including the first virtual identifier and to route the second response to the initiator device via the second routing path based on the second response including the second virtual identifier.

In a seventh aspect, in combination with one or more of the first aspect through the sixth aspect, the first request is associated with or further indicates a target address of the secondary shared resource, and the processing system is further configured to determine the first virtual identifier based at least in part on the target address.

In an eighth aspect, in combination with one or more of the first aspect through the seventh aspect, the primary shared resource is associated with a first access type, and the secondary shared resource is associated with a second access type different than the first access type.

In a ninth aspect, in combination with one or more of the first aspect through the eighth aspect, the first access type is a double data rate (DDR) access type, and the second access type is a Peripheral Component Interconnect Express (PCIe) access type.

In a tenth aspect, in combination with one or more of the first aspect through the ninth aspect, the routing system includes a plurality of double data rate (DDR) channels of a system-on-chip (SoC) device, the secondary shared resource includes a Peripheral Component Interconnect Express (PCIe) off-chip target, the first routing path includes a first DDR channel of the plurality of DDR channels, and the second routing path includes a second DDR channel of the plurality of DDR channels different than the first DDR channel.

In an eleventh aspect, a method of operation of an initiator device includes accessing, via a routing system, a primary shared resource. Access to the primary shared resource is associated with a primary load balancing scheme. The method further includes sending, via the routing system, a first request for access to a secondary shared resource. The first request is associated with a first virtual identifier, and the first virtual identifier is associated with a first routing path through the routing system from the initiator device to the secondary shared resource. The method further includes receiving, via the routing system, a first response from the secondary shared resource based on the first request. The method also includes sending, via the routing system, a second request for access to the secondary shared resource. The second request is associated with a second virtual identifier, and the second virtual identifier is associated with a second routing path through the routing system from the initiator device to the secondary shared resource. The second routing path is different than the first routing path. The method further includes receiving, via the routing system, a second response from the secondary shared resource based on the second request.

In a twelfth aspect, in combination with the eleventh aspect, the secondary shared resource is associated with a plurality of virtual identifiers including the first virtual identifier and the second virtual identifier, and the plurality of virtual identifiers designate respective routing paths of the routing system.

In a thirteenth aspect, in combination with one or more of the eleventh aspect through the twelfth aspect, the plurality of virtual identifiers enable distribution of traffic associated with the secondary shared resource among the routing system independently of the primary load balancing scheme.

In a fourteenth aspect, in combination with one or more of the eleventh aspect through the thirteenth aspect, the first routing path includes a first set of one or more switches of the routing system, the second routing path includes a second set of one or more switches of the routing system, and the first set is non-identical to the second set.

In a fifteenth aspect, in combination with one or more of the eleventh aspect through the fourteenth aspect, the first routing path includes a first set of one or more routing channels of the routing system, the second routing path includes a second set of one or more routing channels of the routing system, and the first set is non-identical to the second set.

In a sixteenth aspect, an apparatus for operation of a secondary shared resource includes a processing system including one or processors and one or more memories coupled to the one or more processors. The processing system is configured to receive, via a routing system, a first request for access at the secondary shared resource. The first request indicates a first virtual identifier associated with the secondary shared resource, and the first virtual identifier is associated with a first routing path through the routing system to the secondary shared resource. The processing system is further configured to send, via the routing system, a first response based on the first request and to receive, via the routing system, a second request for access to the secondary shared resource. The second request indicates a second virtual identifier associated with the secondary shared resource, and the second virtual identifier is associated with a second routing path through the routing system to the secondary shared resource. The second routing path is different than the first routing path. The processing system is further configured to send, via the routing system, a second response based on the second request.

In a seventeenth aspect, in combination with the sixteenth aspect, the secondary shared resource is associated with a plurality of virtual identifiers including the first virtual identifier and the second virtual identifier, and the plurality of virtual identifiers designate respective routing paths of the routing system.

In an eighteenth aspect, in combination with one or more of the sixteenth aspect through the seventeenth aspect, the plurality of virtual identifiers enable distribution of traffic associated with the secondary shared resource among the routing system independently of a primary load balancing scheme associated with a primary shared resource.

In a nineteenth aspect, in combination with one or more of the sixteenth aspect through the eighteenth aspect, the first routing path includes a first set of one or more switches of the routing system, the second routing path includes a second set of one or more switches of the routing system, and the first set is non-identical to the second set.

In a twentieth aspect, in combination with one or more of the sixteenth aspect through the nineteenth aspect, the first routing path includes a first set of one or more routing channels of the routing system, the second routing path includes a second set of one or more routing channels of the routing system, and the first set is non-identical to the second set.

In a twenty-first aspect, in combination with one or more of the sixteenth aspect through the twentieth aspect, the processing system is further configured to send, via the routing system, a first response based on the first request and to send, via the routing system, a second response based on the second request. The routing system is configured to route the first response to an initiator device via the first routing path based on the first response including the first virtual identifier and to route the second response to the initiator device via the second routing path based on the second response including the second virtual identifier.

In a twenty-second aspect, in combination with one or more of the sixteenth aspect through the twenty-first aspect, the first request is associated with or further indicates a target address of the secondary shared resource, and the processing system is further configured to determine the first virtual identifier based at least in part on the target address.

In a twenty-third aspect, in combination with one or more of the sixteenth aspect through the twenty-second aspect, the primary shared resource is associated with a first access type, and the secondary shared resource is associated with a second access type different than the first access type.

In a twenty-fourth aspect, in combination with one or more of the sixteenth aspect through the twenty-third aspect, the first access type is a double data rate (DDR) access type, and the second access type is a Peripheral Component Interconnect Express (PCIe) access type.

In a twenty-fifth aspect, in combination with one or more of the sixteenth aspect through the twenty-fourth aspect, the routing system includes a plurality of double data rate (DDR) channels of a system-on-chip (SoC) device, the secondary shared resource includes a Peripheral Component Interconnect Express (PCIe) off-chip target, the first routing path includes a first DDR channel of the plurality of DDR channels, and the second routing path includes a second DDR channel of the plurality of DDR channels different than the first DDR channel.

In a twenty-sixth aspect, a method of operation of a secondary shared resource includes receiving, via a routing system, a first request for access at the secondary shared resource. The first request indicates a first virtual identifier associated with the secondary shared resource, and the first virtual identifier is associated with a first routing path through the routing system to the secondary shared resource. The method further includes sending, via the routing system, a first response based on the first request and receiving, via the routing system, a second request for access to the secondary shared resource. The second request indicates a second virtual identifier associated with the secondary shared resource, and the second virtual identifier is associated with a second routing path through the routing system to the secondary shared resource. The second routing path is different than the first routing path. The method further includes sending, via the routing system, a second response based on the second request.

In a twenty-seventh aspect, in combination with the twenty-sixth aspect, the secondary shared resource is associated with a plurality of virtual identifiers including the first virtual identifier and the second virtual identifier, and the plurality of virtual identifiers designate respective routing paths of the routing system.

In a twenty-eighth aspect, in combination with one or more of the twenty-sixth aspect through the twenty-seventh aspect, the plurality of virtual identifiers enable distribution of traffic associated with the secondary shared resource among the routing system independently of a primary load balancing scheme associated with a primary shared resource.

In a twenty-ninth aspect, in combination with one or more of the twenty-sixth aspect through the twenty-eighth aspect, the first routing path includes a first set of one or more switches of the routing system, the second routing path includes a second set of one or more switches of the routing system, and the first set is non-identical to the second set.

In a thirtieth aspect, in combination with one or more of the twenty-sixth aspect through the twenty-ninth aspect, the first routing path includes a first set of one or more routing channels of the routing system, the second routing path includes a second set of one or more routing channels of the routing system, and the first set is non-identical to the second set.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via processor circuitry, via executable instructions, or combinations thereof.

A hardware and data processing apparatus used to implement one or more illustrative logics, logical blocks, modules, and circuits described herein may be implemented or performed with a single-or multi-chip processor, a digital signal processor (DSP), an application specific integrated circuit (ASIC), a field programmable gate array (FPGA) or other programmable logic device, discrete gate or transistor logic, discrete hardware components, or any combination thereof. A processor may be a microprocessor, controller, microcontroller, state machine, or other processor. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, one or more functions may be stored on or transmitted over as one or more instructions or code on a computer-readable medium. The operations of a method or process disclosed herein may be implemented in a processor-executable software module which may reside on a computer-readable medium. Computer-readable media includes computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for operation of an initiator device, the apparatus comprising:
  a processing system including one or more processors and one or more memories coupled to the one or more processors, the processing system configured to:
    access, via a routing system, a primary shared resource, wherein access to the primary shared resource is associated with a primary load balancing scheme;
    send, via the routing system, a first request for access to a secondary shared resource, wherein the first request is associated with a first virtual identifier, and wherein the first virtual identifier is associated with a first routing path through the routing system from the initiator device to the secondary shared resource; and
    send, via the routing system, a second request for access to the secondary shared resource, wherein the second request is associated with a second virtual identifier, and wherein the second virtual identifier is associated with a second routing path through the routing system from the initiator device to the secondary shared resource, the second routing path different than the first routing path.

2. The apparatus of claim 1, wherein the secondary shared resource is associated with a plurality of virtual identifiers including the first virtual identifier and the second virtual identifier, and wherein the plurality of virtual identifiers designate respective routing paths of the routing system.

3. The apparatus of claim 2, wherein the plurality of virtual identifiers enable distribution of traffic associated with the secondary shared resource among the routing system independently of the primary load balancing scheme.

4. The apparatus of claim 1, wherein the first routing path includes a first set of one or more switches of the routing system, wherein the second routing path includes a second set of one or more switches of the routing system, and wherein the first set is non-identical to the second set.

5. The apparatus of claim 1, wherein the first routing path includes a first set of one or more routing channels of the routing system, wherein the second routing path includes a second set of one or more routing channels of the routing system, and wherein the first set is non-identical to the second set.

6. The apparatus of claim 1, wherein the processing system is further configured to:
  receive, via the routing system, a first response from the secondary shared resource based on the first request; and

receive, via the routing system, a second response from the secondary shared resource based on the second request,
  wherein the routing system is configured to route the first response to the initiator device via the first routing path based on the first response including the first virtual identifier and to route the second response to the initiator device via the second routing path based on the second response including the second virtual identifier.

7. The apparatus of claim 1, wherein the first request is associated with or further indicates a target address of the secondary shared resource, and wherein the processing system is further configured to determine the first virtual identifier based at least in part on the target address.

8. The apparatus of claim 1, wherein the primary shared resource is associated with a first access type, and wherein the secondary shared resource is associated with a second access type different than the first access type.

9. The apparatus of claim 8, wherein the first access type is a double data rate (DDR) access type, and wherein the second access type is a Peripheral Component Interconnect Express (PCIe) access type.

10. The apparatus of claim 1, wherein the routing system includes a plurality of double data rate (DDR) channels of a system-on-chip (SoC) device, wherein the secondary shared resource includes a Peripheral Component Interconnect Express (PCIe) off-chip target, wherein the first routing path includes a first DDR channel of the plurality of DDR channels, and wherein the second routing path includes a second DDR channel of the plurality of DDR channels different than the first DDR channel.

11. A method of operation of an initiator device, the method comprising:
  accessing, via a routing system, a primary shared resource, wherein access to the primary shared resource is associated with a primary load balancing scheme;
  sending, via the routing system, a first request for access to a secondary shared resource, wherein the first request is associated with a first virtual identifier, and wherein the first virtual identifier is associated with a first routing path through the routing system from the initiator device to the secondary shared resource; and
  sending, via the routing system, a second request for access to the secondary shared resource, wherein the second request is associated with a second virtual identifier, and wherein the second virtual identifier is associated with a second routing path through the routing system from the initiator device to the secondary shared resource, the second routing path different than the first routing path.

12. The method of claim 11, wherein the secondary shared resource is associated with a plurality of virtual identifiers including the first virtual identifier and the second virtual identifier, and wherein the plurality of virtual identifiers designate respective routing paths of the routing system.

13. The method of claim 12, wherein the plurality of virtual identifiers enable distribution of traffic associated with the secondary shared resource among the routing system independently of the primary load balancing scheme.

14. The method of claim 11, wherein the first routing path includes a first set of one or more switches of the routing system, wherein the second routing path includes a second set of one or more switches of the routing system, and wherein the first set is non-identical to the second set.

15. The method of claim 11, wherein the first routing path includes a first set of one or more routing channels of the routing system, wherein the second routing path includes a second set of one or more routing channels of the routing system, and wherein the first set is non-identical to the second set.

16. An apparatus for operation of a secondary shared resource, the apparatus comprising:

a processing system including one or processors and one or more memories coupled to the one or more processors, the processing system configured to:

receive, via a routing system, a first request for access at the secondary shared resource, wherein the first request indicates a first virtual identifier associated with the secondary shared resource, wherein the first virtual identifier is associated with a first routing path through the routing system to the secondary shared resource, wherein the routing system is associated with a primary shared resource, and wherein access to the primary shared resource is associated with a primary load balancing scheme; and receive, via the routing system, a second request for access to the secondary shared resource, wherein the second request indicates a second virtual identifier associated with the secondary shared resource, and wherein the second virtual identifier is associated with a second routing path through the routing system to the secondary shared resource, the second routing path different than the first routing path.

17. The apparatus of claim 16, wherein the secondary shared resource is associated with a plurality of virtual identifiers including the first virtual identifier and the second virtual identifier, and wherein the plurality of virtual identifiers designate respective routing paths of the routing system.

18. The apparatus of claim 17, wherein the plurality of virtual identifiers enable distribution of traffic associated with the secondary shared resource among the routing system independently of the primary load balancing scheme associated with the primary shared resource.

19. The apparatus of claim 16, wherein the primary shared resource is associated with a first access type, and wherein the secondary shared resource is associated with a second access type different than the first access type.

20. The apparatus of claim 19, wherein the first access type is a double data rate (DDR) access type, and wherein the second access type is a Peripheral Component Interconnect Express (PCIe) access type.

21. The apparatus of claim 16, wherein the first routing path includes a first set of one or more switches of the routing system, wherein the second routing path includes a second set of one or more switches of the routing system, and wherein the first set is non-identical to the second set.

22. The apparatus of claim 16, wherein the first routing path includes a first set of one or more routing channels of the routing system, wherein the second routing path includes a second set of one or more routing channels of the routing system, and wherein the first set is non-identical to the second set.

23. The apparatus of claim 16, wherein the processing system is further configured to:

send, via the routing system, a first response based on the first request; and send, via the routing system, a second response based on the second request, wherein the routing system is configured to route the first response to an initiator device via the first routing path based on the first response including the first virtual identifier and to route the second response to the initiator device via the second routing path based on the second response including the second virtual identifier.

24. The apparatus of claim 16, wherein the first request is associated with or further indicates a target address of the secondary shared resource, and wherein the processing system is further configured to determine the first virtual identifier based at least in part on the target address.

25. The apparatus of claim 16, wherein the routing system includes a plurality of double data rate (DDR) channels of a system-on-chip (SoC) device, wherein the secondary shared resource includes a Peripheral Component Interconnect Express (PCIe) off-chip target, wherein the first routing path includes a first DDR channel of the plurality of DDR channels, and wherein the second routing path includes a second DDR channel of the plurality of DDR channels different than the first DDR channel.

26. A method of operation of a secondary shared resource, the method comprising:

receiving, via a routing system, a first request for access at the secondary shared resource, wherein the first request indicates a first virtual identifier associated with the secondary shared resource, wherein the first virtual identifier is associated with a first routing path through the routing system to the secondary shared resource, wherein the routing system is associated with a primary shared resource, and wherein access to the primary shared resource is associated with a primary load balancing scheme; and receiving, via the routing system, a second request for access to the secondary shared resource, wherein the second request indicates a second virtual identifier associated with the secondary shared resource, and wherein the second virtual identifier is associated with a second routing path through the routing system to the secondary shared resource, the second routing path different than the first routing path.

27. The method of claim 26, wherein the secondary shared resource is associated with a plurality of virtual identifiers including the first virtual identifier and the second virtual identifier, and wherein the plurality of virtual identifiers designate respective routing paths of the routing system.

28. The method of claim 27, wherein the plurality of virtual identifiers enable distribution of traffic associated with the secondary shared resource among the routing system independently of the primary load balancing scheme associated with the primary shared resource.

29. The method of claim 26, wherein the first routing path includes a first set of one or more switches of the routing system, wherein the second routing path includes a second set of one or more switches of the routing system, and wherein the first set is non-identical to the second set.

30. The method of claim 26, wherein the first routing path includes a first set of one or more routing channels of the routing system, wherein the second routing path includes a second set of one or more routing channels of the routing system, and wherein the first set is non-identical to the second set.

* * * * *